Dec. 4, 1973 C. E. GRAWEY 3,776,792
METHOD FOR FORMING BELTED OVAL PNEUMATIC TUBE-TIRES
Original Filed June 23, 1969 7 Sheets-Sheet 1

INVENTOR
CHARLES E. GRAWEY

United States Patent Office 3,776,792
Patented Dec. 4, 1973

3,776,792
METHOD FOR FORMING BELTED OVAL PENUMATIC TUBE-TIRES
Charles E. Grawey, Peoria, Ill., assignor to Caterpillar Tractor Co., Peoria, Ill.
Original application June 23, 1969, Ser. No. 835,499. Divided and this application Feb. 25, 1971, Ser. No. 119,022
Int. Cl. B29h 5/01, 17/04
U.S. Cl. 156—124
24 Claims

ABSTRACT OF THE DISCLOSURE

A pneumatic tube-tire is fabricated by applying inextensible reinforcing filaments on an oval toroidal tube member which has its major axis parallel to the axis of revolution of the resulting tube-tire carcass and providing the resulting reinforced tube-tire carcass with an inextensible circumferential belt (i.e. one that is circumferentially inextensible) about its outer periphery to maintain the tube-tire carcass in its oval configuration when the tube-tire is pressurized. The inextensible circumferential belt may be associated with rubber stock forming the tread of the tube-tire and can be formed separately or integrally with the tube-tire carcass. Preferably, the circumferential belt will contain inextensible reinforcing filaments which are oriented generally parallel to the mid-circumferential plane of the tube-tire and generally normal to the reinforcing filaments surrounding the tube-tire carcass. Spaced apart roll restraining hoops are placed within the reinforcing filaments surrounding the tube-tire carcass for lateral stability.

CROSS-REFERENCE TO RELATED APPLICATION

This application is a division of application Ser. No. 835,499, filed June 23, 1969.

BACKGROUND OF THE INVENTION

Early development in pneumatic tires for rubber tired vehicles concentrated on designing tube-tires, i.e. tires which were completely enclosed toroidal assemblies that could be inflated without the aid of separate inner tubes, rims or the like. Emphasis in this area is evidenced by the early patent art typified by the fabric reinforced tube-type structures illustrated in U.S. Pat. 481,681 issued to Wellstein et al.; U.S. Pat. 642,378 issued to Marks; U.S. Pat. 675,064 issued to Laski; and U.S. Pat. 1,276,148 issued to Williams.

With the advent of newer vehicles and changes in desired tire characteristics, the emphasis on the development of pneumatic tires changed to the open center hollow toroidal designs, generally horseshoe-shaped in cross-section, wherein reinforcing cords or filaments are connected between two spaced apart inextensible circular beads located at the inner extremities of the sidewalls of the open center toroidal casing. FIGS. 1 and 5 of U.S. Pat. 3,390,714 issued to Marzocchi aptly illustrate the above described configurations which are in current use on the majority of rubber tired vehicles, regardless of the environment in which they are being utilized.

Theoretically, in the current tire designs, the best utilization of the tensile strength of the reinforcing cords, fibers or filaments would dictate multiple radial plies, i.e. plies composed of parallel reinforcing cords or filaments which lay in radial planes with respect to the center axis of the carcass. While such an arrangement may be ideal, it has not been often employed because of the loss of lateral stability during running conditions which often results in control difficulties and substantially higher power losses. Therefore, a number of expedients have been adapted, one of which is to arrange the parallel reinforcing cords or filaments, in each ply at a bias, as distinguished from the radial plane so that the parallel cords or filaments in the individual plies lay at an acute angle to the mid-circumferential plane of the tire, generally within a range of 30° to 60°. By crossing the cords in alternate plies in the carcass, such that the angles of the reinforcing cords or filaments in successive plies are symmetrically disposed with respect to the mid-circumferential plane, the carcass has greater lateral stability at a sacrifice of the best utilization of the tensile strength in the reinforcing cords or filaments. The above described tires are often referred to as a "biased angle tire" because of the described relationship of the reinforcing cords or filaments in the several plies. In these types of biased angled tires, the ply rating of the tire, meaning the load carrying capacity is usually increased simply by adding more and more plies to increase the strength of the carcass for assimilating the applied load.

Also, it is quite conventional to employ several types of cords or filaments in the above described conventional tire construction whether they are employed on passenger cars, trucks, or off-the-road earth moving vehicles. Typically, the reinforcing cords or filaments have been cotton, rayon, nylon, polyester and other similar materials of the single or multiple strand type which are often incorporated into a sheet which is cut into the proper length, usually on the bias for proper orientation of the reinforcing cords or filaments for building tire. The individual properties of these cords or filaments will determine the wear characteristics of the resulting tire and its service life under various operating conditions.

When a conventional open-center toroidal tire is placed on a vehicle and inflated, the area in which the tire contacts the ground is deflected. In this point of contact with the ground, generally refered to as the tire's "footprint," the circular periphery of the tire is deformed into an essentially flattened area which represents a cord of the circular tire. While the dynamics of the movement of the reinforcing cords or filaments during such deflection is relatively complex and not well understood, it is known that a high shear occurs in bias angle constructed tires due to a relative movement between the reinforcing cords or filaments as they pass into, through, and out of the footprint. This relative movement generates considerable heat and causes the so-called "squirm" of the tread within the footprint which seriously decreases tread life and may cause additional heat to be generated.

Further, as the tire rolls through the footprint considerable flexing occurs in sidewalls of the tire where the ends of the several plies are folded over the restraining beads, especially where their ends are terminated in the sidewall. In this sidewall area, excessive shear also can occur with additional heat buildup, especially during under-inflated conditions which often leads to premature tire failure. Likewise, over-inflation of the tire can be extremely detrimental as well, as the tire will actually grow to a larger size, due to increased pressure, causing localized wear and high preferential loading of the reinforcing cords or filaments as the tire rolls through the footprint. In addition, the higher pressure brings an increased danger of failure of the bead since all the reinforcing cords or filaments are anchored to these structures. Failure of the bead structure, especially during over-inflated conditions, can lead to explosions of considerable magnitude. For example, in an inflated tire of a large earth-moving vehicle, failure of the bead or flange can be followed by an explosion equivalent to that obtained with several sticks of dynamite.

Bead failure in pneumatic tires of the open-center toroidal type is of serious consequence, as it often results in immediate deflation (blow-out), that can affect vehicle control, especially at higher speeds. Factors involved in these failures are numerous, two of the more important being improper fabrication of the tire in the hand-building process and damage to the bead during improper mounting procedures or an improper alignment of the bead on the rim. Also, heat build-up in the tire, especially in multi-ply truck tires, can seriously degenerate the bead structures due to thermal rubber reversion or degradation which allows the wires in the bead to separate which results in failure.

Three percent, by conservative estimates, of the conventional type tires mentioned above are defective from the factory. This is not surprising considering the laborious hand process used in their manufacture. In the fabrication technology of these tires, the tire is built on a cylindrical tire building drum by laboriously wrapping plies of liner, rubberized reinforcing fabrics, cords, or filaments to form a flat endless belt on the surface of the drum. Each outboard edge of the belt is folded over an inextensible bead positioned on each end of the tire building drum to anchor the reinforcing thereto. The resulting structure is called a tire band and as indicated looks much like a flat endless belt, since the plies are normally cut so that their splices are not lapped. The number of plies of reinforcing cords or filaments as well as the strength of the individual reinforcing cords or filaments used in building the tire band determine the ply rating of the tire. During this hand building process of the tire, the individual plies are positioned so their principal reinforcing fibers are at an acute angle with the mid-circumferential plane of the tire band. However, this initial acute angle will change to some other angle in the completed tire since the flat tire band must "grow" in the press and vulcanizing mold to its final open-center toroidal shape.

The tire band is placed in a press and vulcanizing molding machine with rubber tread stock and rubber sidewall stock wherein the tire band is shaped to its familiar open-center toroidal form and cured under heat and pressure. As can be appreciated, during the shaping process the two beads at the outboard ends of the tire band move toward one another while the central portion of the tire band moves outward into the annular cavity of the mold to form the toroidal shape of the finished tire.

Improper layup of the components of the tire band, mishandling of the tire band, improper positioning of the tire band in the shaping and vulcanizing mold and similar mistakes can all lead to the defective tire along with such other problems as improper bonding, air pockets, defective material and improper cure. In view of this, it is not surprising that many of the tires are defective and because the tire is a vulcanized molded unit, these latent defects are difficult, if not impossible, to detect. Further, this hand process leads to lack of uniformity in the tires and it is not unusual for tires from a single manufacture of the same size and type at recommended pressure to vary over an inch and one-half in height when mounted on rims and inflated. Thus, there is considerable need for improvement in uniformity of pneumatic tires, as well as a need to improve reliability in the final tire product, both of which suggest the need for automated processes.

More recently, there has been some reoccurring interest in the tube-tire design as evidenced by U.S. Pat. 3,318,357 issued to Schwall, U.S. Pat. 2,915,102 issued to Alexoff et al., and U.S. Pat. 3,171,462 issued to Reinhart. However, the tube-tire disclosed in the above-mentioned patents do not overcome many of the problems experienced in the open-center toroidal type conventional designs, as well as some of the additional problems specific to a tube-tire design.

Therefore, it is an object of the current invention to provide a tube-tire of special construction that is stronger, more durable and greatly more serviceable than conventional pneumatic tires, or known tube-type tires.

Also, another object of this invention is to provide a belted oval pneumatic tube-tire in which the belt includes a replaceable tread unit whereby additional service life, or different tread units, can be made available through a same reinforced tube-type carcass.

Another object of the instant invention is to provide better utilization of the tensile strength of the reinforcing filaments employed to build the novel tube-type tires.

Also, it is an object of the current invention to provide a tube-type tire in which uniformity in structure can be achieved through automated processes with reliable repeatability.

A further object of the instant invention is the provision of a novel tube-type tire wherein the reinforcing filaments are initially placed in their approximate final positions in the completed tube-tire as the tire is fabricated, thus insuring accurate and reliable positioning of the reinforcing filaments in the tube-tire.

Another object of the invention is the elimination of beads or other reinforcing anchor structures in tire structures, as well as various devices for maintaining the tube-tire on a suitable rim structure.

Still a further object of the instant invention is employment of thinner wall sections without loss of strength thereby obtaining a cooler running tire.

SUMMARY OF THE INVENTION

The above objects, along with many other advantages, are obtained by a low profile pneumatic oval tube-tire which includes an elastomer toroidal tube member with an oval cross section having its major axis parallel to the axis of revolution of the tube-tire, inextensible reinforcing applied to the surface of said toroidal tube member in a manner that said reinforcing longitudinal axis is generally normal to the mid-circumferential plane of said tube member to obtain an oval reinforced tube-tire carcass, an inextensible circumferential belt positioned about the outer circumference of said oval reinforced tube-tire carcass, said circumferential belt having longitudinal axis of its reinforcement generally parallel with said mid-circumferential plane of said tube-tire carcass and generally normal to the longitudinal axis of said reinforcing on said tube-tire carcass, said belt operable to restrain the outer circumference of said resulting oval reinforced tube-tire carcass in its oval configuration when the tube-tire is pressurized, and elastomer stock forming the outer casing surfaces and tread of said tube-tire.

The circumferential belt can be fabricated integrally or separately with the tube-tire reinforced carcass and in the latter case can constitute a replaceable tread unit for the tube-tire. Spaced apart roll restraining hoops which are normally encircled by reinforcing on the tube-tire carcass and are located adjacent to the base of each side wall to improve the lateral stability of the tube-tire. Fabric layers can be employed with the above structures for additional strength and also to insulate the various layers or plies of reinforcing from one another.

In fabricating the novel belted oval tube-tire, the steps include the use of a toroidal rigid core having the selected oval cross section, forming an elastomer tube member on said toroidal core, wrapping inextensible reinforcing on the surface of said elastomer tube member containing rigid core to form a reinforced tube-tire carcass, said reinforcing wrapped with its longitudinal axis substantially normal to the mid-circumferential plane of said tube-tire carcass, and applying an inextensible circumferential belt about the outer circumference of said reinforced tube-tire carcass which is operable to restrain said reinforced tube-tire carcass in its oval configuration when the latter is pressurized. The circumferential belt has the longitudinal axis of its inextensible reinforcement generally substantially parallel with said mid-circumferential plane and can be formed integrally or separately (on a properly sized drum). During the fabrication process uncured elastomers are employed and are ultimately vulcanized into an integral tube-tire carcass. Subsequent to one or more curing steps to the complete fabrication of the tube-tire carcass, the rigid core is disintegrated and removed through the valve stems of the tube-tire leaving a hollow air chamber within the tube-tire.

DESCRIPTION OF THE INVENTION

Figure 1:
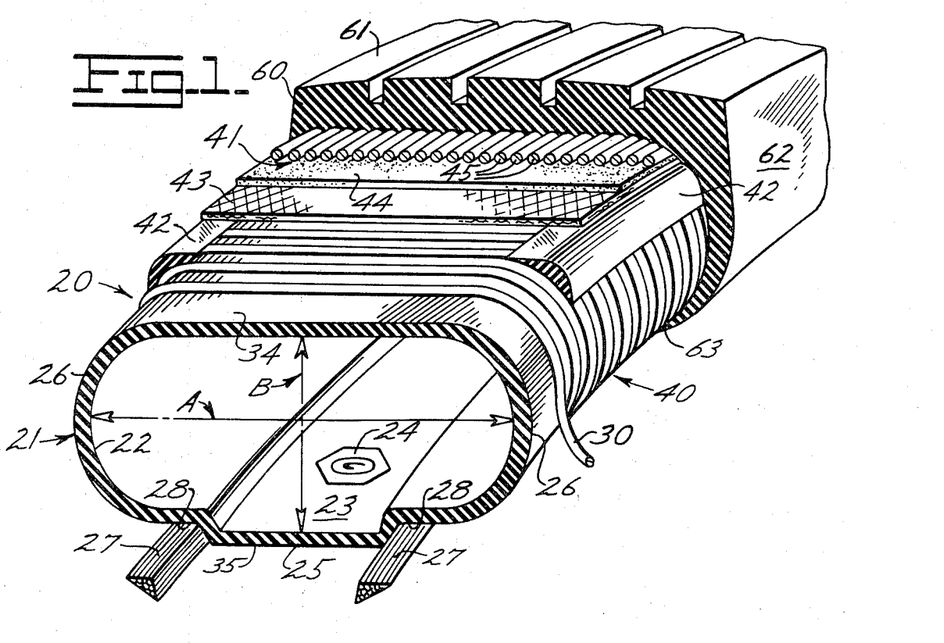
FIG. 1 is a perspective of a broken-away portion of the belted oval tube-tire with additional structure broken away to show internal detail.
Figure 2:
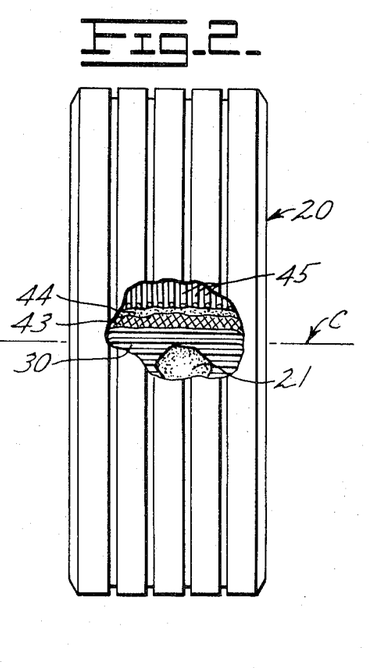
FIG. 2 is an elevation of the tube-tire illustrated in FIG. 1 with parts broken away.

Referring to FIGS. 1 and 2, the general overall appearance of the novel oval pneumatic tube-tire 20 is illustrated, as well as additional internal structural detail. An oval toroidal tube member 21 of a suitable elastomer material forms the liner 22 and air chamber 23 of the tube-tire. Several valve stem units 24 are spaced around the inner periphery of the tube member and project radially inwardly for inflating the air chamber when the tube-tire has been completed. The oval character of the toroidal tube member can be seen in FIG. 1 and its major axis A is essentially parallel with the axis of revolution C of the tube-tire and its minor axis B is essentially coincident with the mid-ciricumferential plane of the tube-tire. Normally, the tube member will be supported and maintained in its oval configuration during fabrication of the tube-tire carcass by a removable rigid core which is subsequently disintegrated and removed through the several valve stems without opening the air chamber. Such a rigid core structure will be more fully explained below.

About the inner periphery 25 of the tube member 21 (hereinafter referred to as rim wall 35) and near the base of each sidewall portion 26 of the tube member is a roll restraining hoop 27 which is a circumferential band. These hoops can be formed of inextensible filaments, cables or even solid metal bands that are coated with an uncured elastomer stock and received in grooves 28 provided in the tube member. However, since these hoops are not anchor beads for the reinforcement, they can be fabricated of nylon, rayon, or polyester with a percentage of elongation up to 20%. They are typically fabricated separately on a drum unit and usually are wedge-shaped in cross section. The grooves insure the proper positioning of the hoops during the subsequent fabrication steps of the novel tube-tire. Alternatively, the roll restraining hoops can be preformed and molded directly in the wall of the tube member as it is formed on the rigid core by transfer molding.

To this oval toroidal tube member 21 whether cured or uncured and while it still contains its rigid core structure, is added inextensible reinforcing so its longitudinal axis is substantially normal to the mid-circumferential plane of the tube member. Often this inextensible reinforcing will take the form of a substantially inextensible filament 30, such as a wire, cable or glass fiber, which has a total elongation percent under five, that is helically wound on the tube member. Reinforcing which has a total elongation of less than 5% shall be considered inextensible for the purposes of the description herein.

Such an inextensible filament 30 can be automatically applied to the oval toroidal tube member 21 by machine winding it about its toroidal shape in a helical manner. This can be accomplished by placing the tube member containing the rigid core with the hoops 27 positioned in grooves 28 in a winding machine 31 (refer to FIG. 3) so tube member is supported for revolution about its axis of revolution C. A segmented bobbin ring 32 is thereafter assembled through the opening of the tube member and mounted in its supporting assembly. A bobbin 33 wound with the inextensible reinforcing filament is mounted on the bobbin ring and the unit includes a tensioning device (not shown) that allows the filament to be applied with uniform tension as both the tube member and the bobbin ring are revolved about the respective axes of revolution. In this manner, the toroidal tube member is uniformly wrapped in a helical fashion with a plurality of loops of inextensible reinforcing filament on substantially rigid foundation formed by the tube member and the core.

Figure 3:
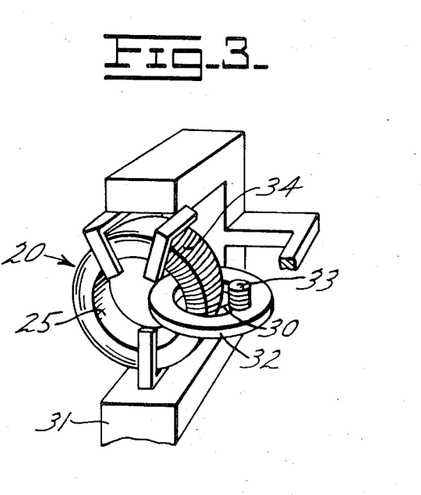
FIG. 3 is a perspective of a winding machine for applying inextensible reinforcing filament to an oval tube member containing a rigid core.

The winding machine can apply the desired percentage of reinforcing coverage of the toroidal tube member by controlling the relative speed of the tube member and the bobbin ring and depending on the filament diameter. Generally, the desired coverage is a single ply in which the inner diameter (rim wall 35) of the toroidal tube member is between 60 to 100 percent and it can be appreciated that since the outside diameter of the toroidal tube member is greater than that of the inner diameter, the coverage on the outer diameter will be substantially less. By using finer diameter filaments, the spacing between adjacent loops on outer diameter is decreased lessening the possibility of extrusion of the elastomers of the tube member between adjacent loops. Further, it is preferred that the respective axes of revolution of the bobbin ring in the toroidal tube member be normal to one another or other steps be taken that will insure that the reinforcing filament is applied for best utilization of its tensile strength, generally in a quasi-radical plane which is substantially normal to the mid-circumferential plane of the tire.

Because the tube member 21 has an oval configuration, the resulting wrapped configuration is of a special character. Basically, this oval configuration of the tube member includes a crown 34 which is generally flat merging into the curved sidewalls 26 which are semicircular in cross section that merge with the bottom rim wall 35 (inner periphery of the tube member) which joins the inboard ends of the two sidewalls. The rim wall can be dished inwardly (toward the axis of revolution C) to a greater degree than illustrated in FIG. 1 (see FIG. 4 for asymmetrical crown and rim wall configurations), since this is not a deflecting area as the tube-tire rolls through its footprint. In view of this oval configuration, the wrap of the loops on the tube member which encircle the roll restraining hoops 27 follows a somewhat unorthodox path resulting in a reinforced tube member which herein is referred to as an "oval-wound" tube member.

Figure 5:
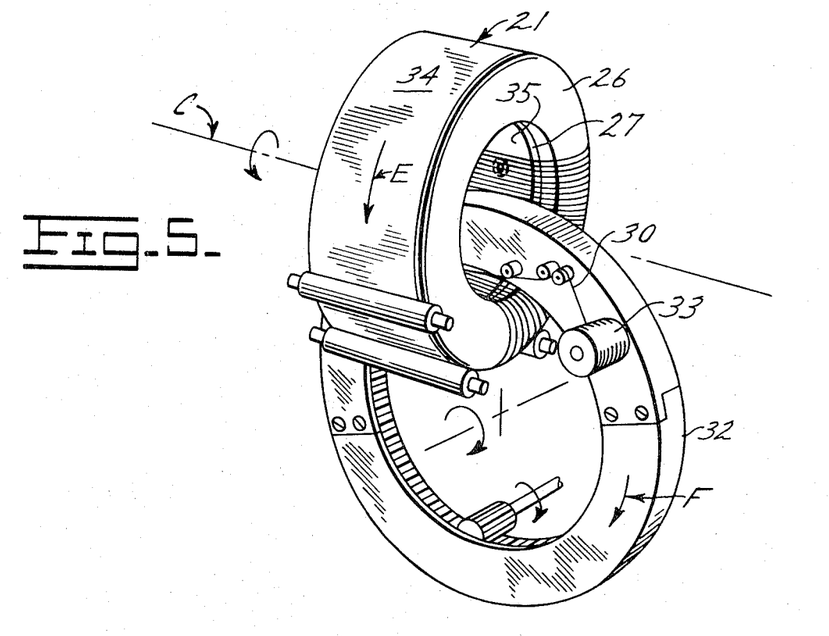
FIG. 5 is a quarter-top perspective of only the bobbin ring and oval tube member shown in the winding machine of FIG. 3, to better illustrate the helical application of a continuous reinforcing filament to the tube member.

Referring to FIG. 5, a top perspective view of the tube member and the bobbin ring, the winding pattern of the filament is more apparent. If the tube member is continuously advanced in the direction indicated by arrow E and the bobbin ring is uniformly advanced in the direction indicated by arrow F, it can be appreciated that the reinforcing filament 30 will track in a generally helical pattern on the curved sidewall 26 but when crossing the substantially flat crown section 34 will approximate a straight line (a geodesic path) which is approximately normal to the mid-circumferential plane of the tube member. Further, as the winding continues, the generally helical track will be followed on the opposite sidewall after which the filament track again will lie in a substantially straight line (a geodesic path) across the rim wall of the tube member, if the latter is flat like the crown. Since the reinforcing filament is applied to the tube member while it still contains the rigid core structure, the tube member and core form a solid rigid supporting foundation for the uniform application of the reinforcing filament to the tube member under constant tension. The oval configuration of the tube member during the winding of filament (maintained by the rigid core structure) is substantially the size and configuration the tube member will have in the completed tube-tire carcass when pressurized and thus the reinforcing filament is actually initially wound in the position that it will ultimately have in the completed tube-tire. Under such controlled conditions, there is less chance for any error in the placement of the individual filament loops and uniformity in the final product is obtainable. Also, it is possible to helically wind the tube member either in an uncured state or a cured state. However, if the tube member is cured before the wrapping with filament 30, the surfaces of the tube member should be buffed to insure better elastomer-elastomer and elastomer-wire adhesion when the final cure is accomplished to vulcanize the structures into an integral unit. The buffed outer surface of the tube member can be primed with a suitable adhesive or bonding agent to improve the bonding between the reinforcing and elastomers of the tube member. Also, the reinforcing filament, if wire, can be plated with brass to improve adhesion with the elastomers when the final cure of the elastomers is accomplished. Open-meshed fabrics may be placed between the tube member and the reinforcing filament to prevent the latter from cutting into the softer uncured elastomer when the tube member is wound in its uncured state.

When the tube member 21 has been "oval-wound" (as described above) with an inextensible reinforcing filament 30 and the free ends of the filament where the winding commences and ends are joined, the preferred embodiment of the oval tube-tire carcass 40 is completed. It should be appreciated that alternative types of reinforcing can be used to the filament wound type described above. For example, a plurality of metal bands which are mechanically locked in the central portion of the rim wall 35 of the tube member where there is little or no movement during tire operation can be employed and these bands can also be shaped so that the same percentage of reinforcing coverage is achieved on the crown 34 as is obtained on the rim wall. Of course, identical percentage coverage on the crown and the rim wall is not possible with the preferred filament "oval-wound" embodiment.

If the reinforced tube-tire carcass 40 at this point in the fabrication were pressurized free of any restraint, the carcass would tend to distort from its oval cross sectional shape to a circular cross sectional shape due to the action of the air pressure in the air chamber 23. However, since this carcass is restrained by its belt and rim and its inextensible reinforcement encircling it is already located in the nearly ideal geodesic path, pressurization will not cause relocation of the reinforcement which causes conventional bias angle tires to grow when pressure is increased. Radial tires also "grow" but not to the same extent when they are pressurized because they are normally fabricated of synthetic filaments or fibers which have high elongation percentages in the range of 20 percent and usually are restrained by bias angle belts that expand under pressurization. Of course, it is not desirable to pressurize the unrestrained tube-tire carcass without completing the tube-tire since such inflation would tend to stretch the crown 34 of the tube member and bunch the rim wall 35 as the cross sectional configuration changed from oval to circular. Also, a tube member, circular in cross section and wound with a reinforcing filament, as herein described, is unsuitable since, if compressed into the oval configuration of the oval tube-tire carcass 40, it would have a bunched crown (an excess of tube surface) since the outer circumference would be decreased during such a change. Similarly, the rim wall would be stretched considerably. It can be appreciated that the reinforcing filaments 30 even though initially properly positioned on such a circular tube member would be non-uniformly shifted during such a change in configuration and would be improperly positioned or located after such a transition to the oval cross section.

An inextensible circumferential belt 41 (a belt which is substantially circumferentially inextensible) is placed about periphery of the oval tube-tire carcass 40 and is fitted to the periphery of the tube-tire carcass in a manner which prevents the latter from changing appreciably toward a circular cross section upon pressurization of its air chamber. This circumferential belt restains the tube-tire carcass substantially in its oval configuration (i.e. the configuration of the tube member when its reinforcing is applied) and also provides a reinforcing ply or layer highly resistant to puncture.

Figure 6:
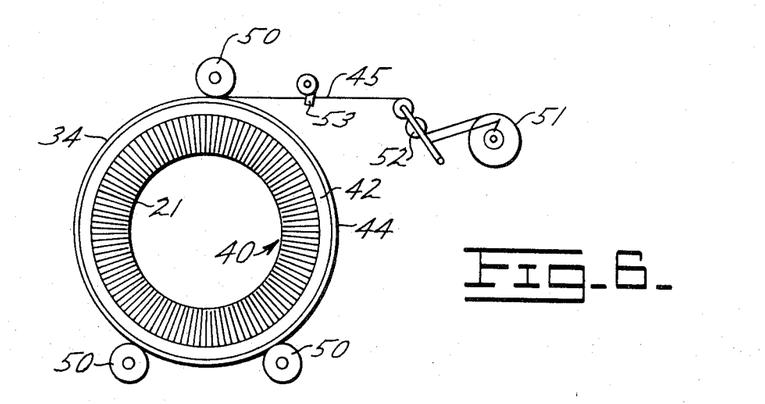
FIG. 6 is a schematic elevation of the tube-tire carcass illustrating application of a filament across the crown of the reinforced tube-tire carcass to form a circumferentially inextensible belt thereon.

In FIG. 1, this circumferential belt is integrally formed with the tube-tire carcass 40 after preformed uncured elastomer shoulders 42 have been positioned circumferentially at the top of each sidewall where each joins the crown 34, to extend the flatness of the crown out over each of the sidewalls to protect them from abrasion and puncture. Thereafter, a layer of fabric 43 is applied over the crown to insulate the loops of reinforcing filament 30 on the tube-tire carcass from filament 45 of the circumferential belt 41. On top of this layer of fabric, a thin layer of uncured elastomer 44 is usually applied, but this layer can alternatively be calendered into the fabric. On the elastomer layer is applied an inextensible belt of filament 45 which is wound helically across the outer circumference of the crown as illustrated in FIG. 6. This reinforcing filament, like the filament 30, is inextensible and can be composed of wires, cables, glass fibers or similar filament materials having a less than five percent elongation. Normally, each helical loop of the filament 45 is closely adjacent to the preceding loop so that 60 to 95 percent of the crown 34 is covered with the windings. Thus, the resulting circumferential belt ply 41 will have a high resistance to puncture. Also, the wrap angle of the filament 45 on the crown with the mid-circumferential plane of the tire is less than ⅙ degree and normally within 1½ to 3 minutes of being parallel with the mid-circumferential plane and thus is substantially parallel therewith. It can be appreciated that upon inward deflection of the completed tube-tire, the circumferential belt will tend to distribute the loading to multiple loops of the reinforcing filament 30 surrounding the tube-tire carcass 40.

Referring to FIG. 6, schematically illustrating the application of the belt, the tube-tire carcass 40 is supported on drive rollers and a filament 45 from bobbin 51 passes through a tensioning unit 52 and over a level winding guide 53 so that a continuous helical circumferential wrap can be applied to the crown 34 of the tube-tire as previously indicated. It can be appreciated by recalling the character of the oval-wound tube-tire carcass and considering the application of the circumferential belt as described, that the individual filaments 30 and 45 are generally normal to one another and that each helical loop in this circumferential belt is substantially parallel with the mid-circumferential plane D of the tube-tire carcass. With the above orientation of the several reinforcing filaments, the tube-tire achieves nearly maximum utilization of the tensile strength of the filaments in both the belt and in the tube-tire carcass. Of course, it should also be appreciated that a plurality of parallel closed hoops could be employed in a side-by-side relationship in place of helically winding reinforcing filament 45, on the tube-tire carcass.

Subsequent to the placing of the circumferential belt on the tube-tire carcass in the integrally formed tube-tire embodiment, uncured elastomer stock is applied to the assembly for the undertread 60, the actual tread 61, the outer casing sidewalls 62, and outer casing rim wall 63. Thereafter the assembly is cured under heat and pressure in a vulcanizing and forming mold to complete the tube-tire.

Figure 7:
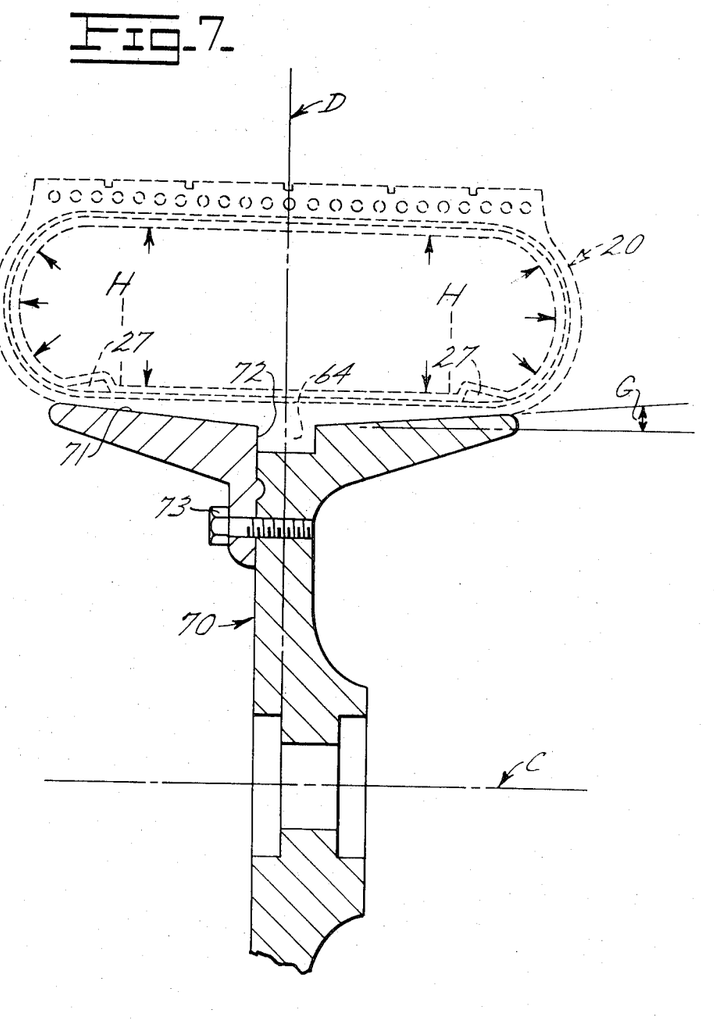
FIG. 7 is a section of a rim structure for mounting the tube-tire of FIGS. 1 and 2 with the tube-tire shown with broken lines.

After the tube-tire is vulcanized into an integral unit, the core is disintegrated and removed through the several valve stems after which a completed tube-tire 20, as detailed in FIG. 1, can be mounted on a split rim structure 70, illustrated in FIG. 7. The rim face 71 is flat but is flared outwardly from the mid-circumferential plane D by an angle of G which can be from 3 to 15 degrees. A centering recess 72 in the central portion of the rim face receives a centering ring 64 which protrudes into the recess in a radial direction from the casing rim wall 63 of the tube-tire for centering it on the split rim structure. After the lug bolts 73 secured the split portions of the rim and the tube-tire is inflated which causes the roll restraining hoops 27 to wedge outwardly from their initial position H to their final position as illustrated in FIG. 7. The wedging action occurring during inflation insures a good dirt seal between the tube-tire and the rim structures which prevents the ingress of dirt to the area between the casing rim wall and the rim face. Through the utilization of the roll restraining hoops and the low profile of the tube-tire (usually an aspect ratio under 0.7) the lateral stability of the tube-tires is improved since the roll restraining hoops resist the lateral rolling movement of the tube-tire. This lateral movement is not otherwise restrained in the tube-tire structure described above. Further, it can be appreciated that the roll restraining hoops do not function to anchor the reinforcing filaments 30, as do the beads in conventional tires.

The loops of filament 30 encircling the "oval-wound" tube-tire carcass 40 are not anchored but are a series of continuous connected loops. The fact that these loops are not separately anchored will not cause the tire to disintegrate upon isolated separations in the filament loops since the filament bond to the elastomer stock is normally sufficient that the effect of any individual break is highly localized. Loss of strength in the tube-tire normally occurs only in the area several inches on either side of a break in a filament loop and filament loops on either side of a broken loop will tend to mitigate the effect by assuming the load. The situation is true for breaks in the filament loops in the circumferential belt 41.

Once the tube-tire has been mounted on a rim structure, the inflation pressure of its air chamber 23 can be varied appreciably since the only limitation on the inflation pressure is the tensile strength of the inextensible reinforcing filaments and the ability of the structure to prevent extrusion of the elastomer between the reinforcing filament loops at the higher pressures. Thus, unlike conventioned tires which must be operated at a selected design pressure for maximum service life and safe operation, the instant tube-tire can be safely operated over a wide range of pressures. In fact, these tube-tires can be designed for a set deflection and the air pressure in the tube-tires changed as the load on these tires changed to maintain a desired deflection. Thus, these novel tube-tires can maintain the same cool running charactetristics in an unloaded and loaded condition by merely varying their air pressure without danger of explosion, increased wear or preferential loading of the reinforcing. Obviously, if the high pressures, as contemplated in the instant tube-type tire, were employed in a conventional beaded tire structure, there would be an increased hazard of explosion since the earlier mentioned problems of bead and rim failure in such conventional tires are magnified with increased pressure.

As indicated above, the roll restraining hoops 27 do not form anchors for the loops of filament 30 and therefore are unaffected by changes of pressure within the resulting tube-tire. Further, these roll restraining hoops 27 do not provide a member for transmitting substantial torques between the tire and the rim structure and as indicated can be fabricated of extensible filaments. Because the tube-tire is mounted on a rim face which has an outer diameter approximately the same as the inner diameter of the casing rim wall 63, upon pressurization of tube-tire air pressure in the air chamber will tend to expand the crown 34 into the circumferential belt 41 and force the casing rim wall against the rim face. As a result, high unit pressures occur between the circumferential belt and the crown and betewen the rim face and casing rim wall so there is no relative movement between these several parts as the tube-tire passes through its footprint, even under high rim to tube-tire torques. Thus, the whole casing rim wall provides tube-tire to rim drive across the full rim face and the circumferential belt 41 to crown drive is such that no relative movement will occur.

Figure 8:
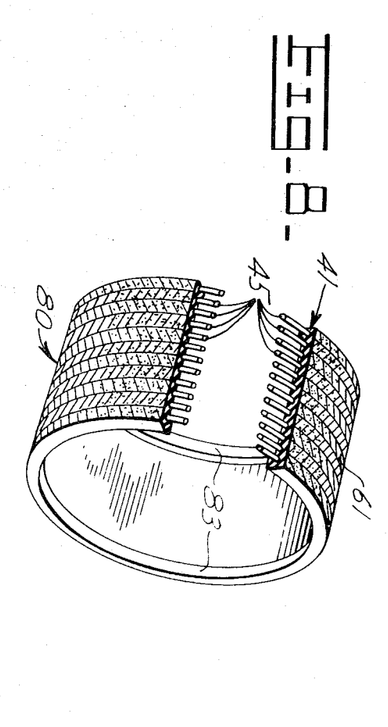
FIG. 8 is a perspective of a removable tread belt, with parts broken away, which contains the inextensible circumferential belt.

In FIG. 8, a removable tread belt 80 is illustrated which includes the inextensible circumferential belt 41 composed of filament 45 within the tread belt. The actual tread 61 is included in the tread belt and is assembled on a cured tube-tire carcass 81 shown in FIG. 9 on which elastomer stock has been applied to protect the reinforcement filament 30 of the tube-tire carcass 40 and to form the undertread 60, casing sidewalls 62, casing rim wall 63 and the centering ring 64. The tread belt illustrated in FIG. 8 is designed to over-lap the outer sidewalls of the cured tube carcass and has a sidewall sealing ring 83 at each side which tends to prevent the ingress of dirt and dust between the tread belt and crown of the cured tube-tire carcass. It can be appreciated excellent crown to tread belt drive is available because of the design and for the reasons previously mentioned.

Figure 10:
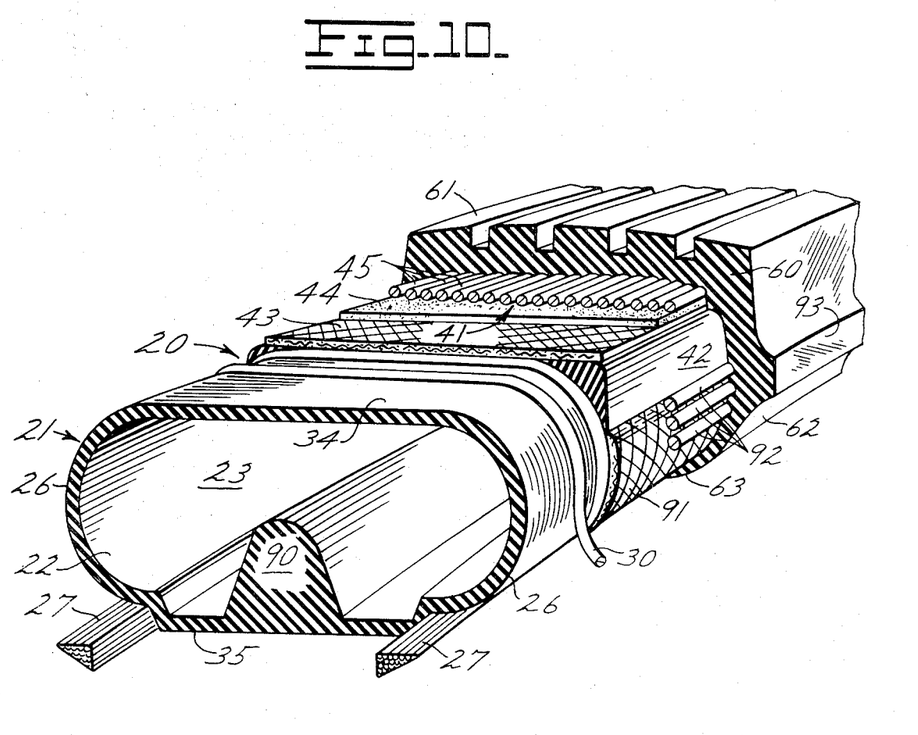
FIG. 10 is a perspective of a portion of another embodiment of the tube-tire with parts broken away.

In FIG. 10, an embodiment of the tube-tire similar to that shown in FIG. 1 is illustrated with several additional innovations. These additional innovations include an internal elastomer bumper 90 to limit the maximum inward deflection of the tread as the footprint of the tube-tire passes over irregular objects; a fabric reinforcing 91 with a coiled filament 92 centrally located internally in the mid area of each casing sidewall 62 to increase the puncture resistance of the sidewall and eliminate preferential sidewall loading of the multiple loops of filament 30; and an exterior circular curb guard 93 in the outer mid area of the outside of the casing sidewall. Parts of the tube-tire illustrated in FIG. 10 which are identical to those of the tube-tire illustrated in FIG. 1 have identical numerals.

Above, reference has been made numerous times to the oval nature of the tube-tire 20 and its toroidal tube member 21. Now reference is made to FIG. 11 for additional detail on this oval character wherein a preferred oval cross section of the toroidal tube member 21 is illustrated with its accompanying core. Its major axis A is parallel with the axis of revolution C of the tire and torus and its minor axis B is coincidental with the mid-circumferential plane D of the tube-tire. In section, the tube member sidewalls 26 are semi-circular in shape with the radius of R which is approximately one-half the tube-tire thickness J immediately inboard and adjacent the sidewalls where they merge into the crown 34 and rim wall 35 of the tube member. The maximum *thickness* of the cross section will be along the minor axis B of the oval cross section and will depend upon the degree of convexness of the crown, for example that represented by broken line 34', and a degree of convexness of the rim wall, for example that represented by broken line 35'. It is readily apparent that the oval cross section of the tube member need not have symmetry between its crown and rim wall (on opposite sides of its major axis); however, there is symmetry between the two halves of the oval tube member section divided by its minor axis. Preferably, crown will be substantially flat between the two side walls.

Figure 11:
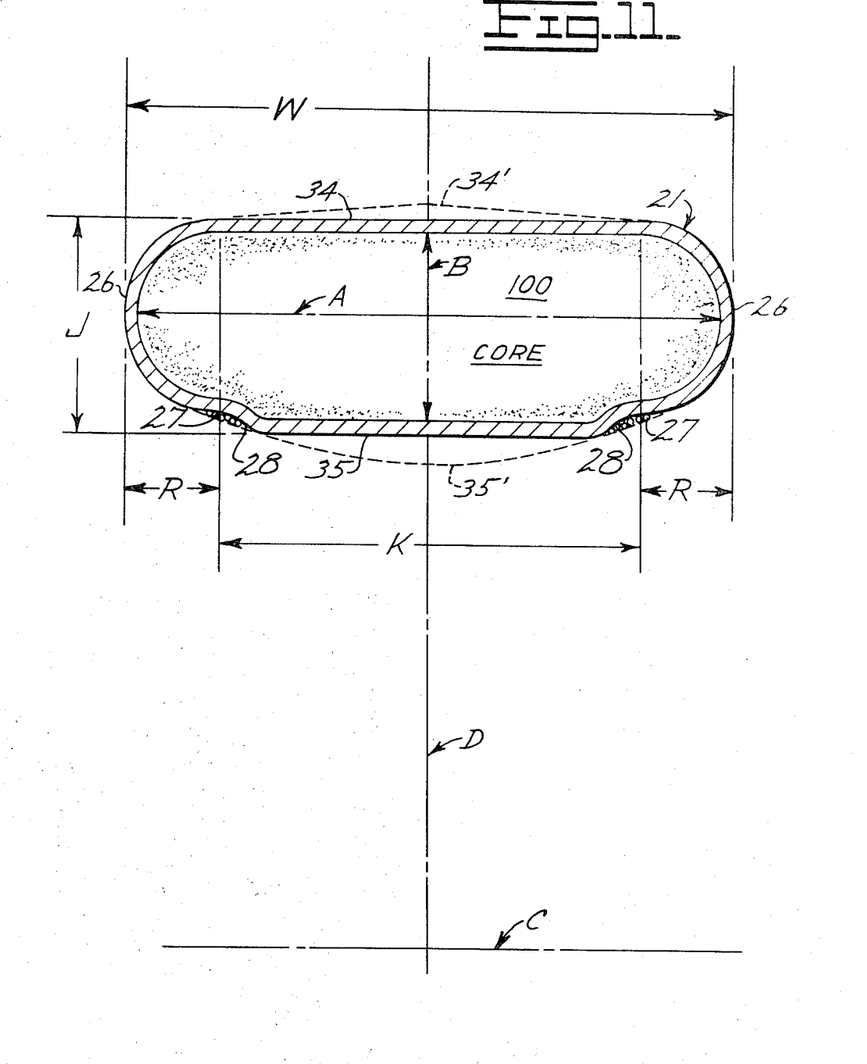
FIG. 11 is a section of the tube member and its sand core illustrating the general oval cross sectional character of the tube member and rigid core.

Dimension K of the tube member illustrated in FIG. 11 is variable and can be changed to increase or decrease the overall width W of the tube member and thus the width of the novel tube-tire carcass 40. This represents an important feature of the novel tube-tire since its footprint area can be conveniently changed for different kinds of vehicles or sizes by merely adjusting dimension K which allows the same fabrication equipment to be used for several different widths of tube-tires constructed according to this invention. This represents a considerable savings in equipment costs and also allows rim sizes and the outer diameter of the tires to be standarized.

Wherever "oval" is referred to herein with reference to the tube-tire carcass or its tube components, the general cross section characteristics described above are intended to be set forth as fully as though the description of FIG. 11 were completely repeated. Of course, it can be appreciated that while FIG. 11 sets forth the approximate relationships of the oval cross sectional character dimensions of the carcass, the addition of the outer rim wall, outer sidewalls and undertread forming the protective outer casing can change outside configuration of the tube-tire as will the addition of the circumferential belt 41 and the actual tread 61.

Figure 4:
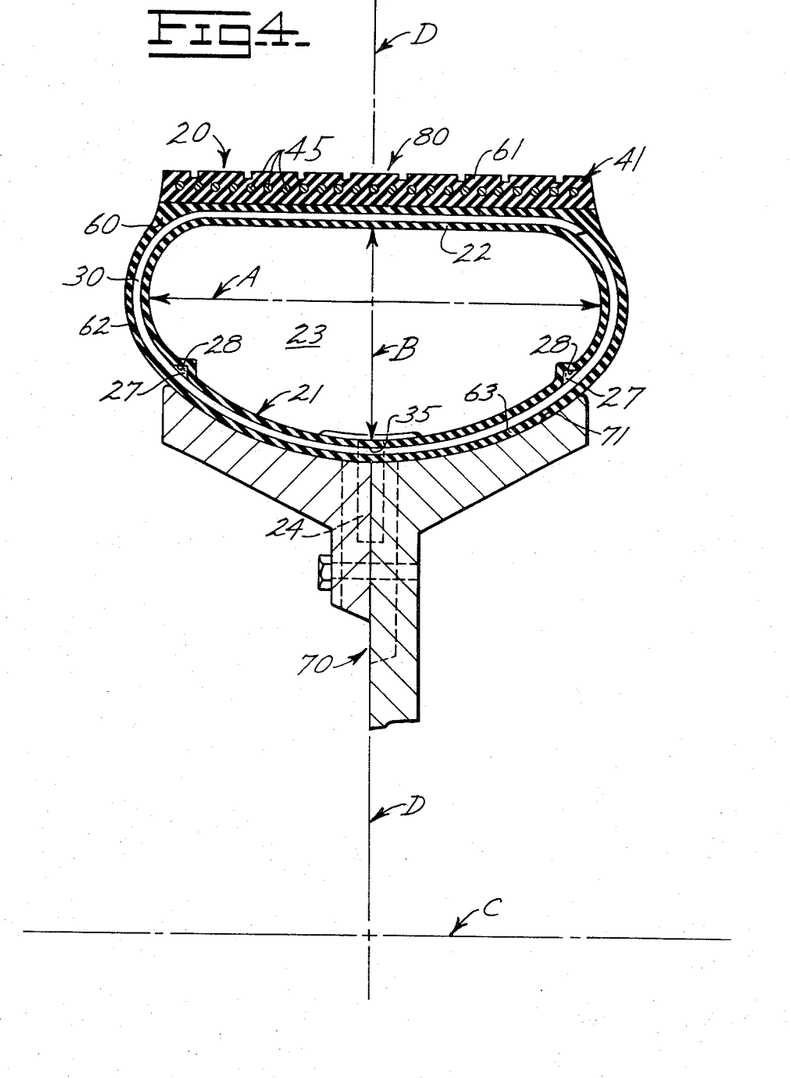
FIG. 4 is a section of an alternate embodiment of the novel tube-tire mounted on a rim structure with parts broken away.

In the alternative tube-tire configuration illustrated in FIG. 4, the tube-tire 20 does not include a centering ring 64 and the outer surface of the rim wall 35 has a more convex shape than the configuration illustrated in FIG. 7. However, it should be appreciated that the convex cross sectional configuration of the rim wall must not approach a semi-circle, since this would eliminate the high unit pressures between the casing rim wall and the rim face 71 which retains the tube-tire on the rim face and establishes the "drive" therebetween. It can be appreciated if the lower half of the novel tube-tire were semi-circular in cross section that the reinforcing filament 30 being inextensible would carry the air pressure loading and the high unit presures would not be available between the rim wall and the rim face of the rim structure. Since the novel tube-tire employs these high unit pressures between the rim wall and the rim face to retain the tube-tire on the rim, it is possible to eliminate tire-rim holding structures, such as illustrated in the aforementioned Reinhart and Schwall patents or the conventional rim flanges holding the beads of conventional tires.

By employing the maximum tensile strength of the inextensible reinforcing filaments the wall thicknesses of the tube-tire casing can be reduced to a minimum. In most cases, the reinforcing will consist solely of a single layer, wrap or ply of inextensible filament both in the tube-tire carcass 40 and in the circumferential belt 41. Utilizing the thinner wall sections will tend to prevent the heat build-up in the tube-tire, improving both reliability and service life. Further, upon deflection of the tube-tire as it rolls through its footprint, there is little heat generated from shear because of the construction which allows the reinforcing filaments to "bend" but not shift as do the reinforcing filaments in conventional tires which generate heat. Further, elimination of the filament shifting in the carcass will substantially reduce "squirm" of the tire tread. Also, bead anchoring structures are eliminated with their accompanying problems.

As indicated previously, the tube-tire is constructed with inextensible reinforcing filaments, such as filaments 30 and 45, which have a maximum elongation of less than five percent. High tensile strength is also required, usually in the range of 400,000 p.s.i. or higher. Glass fiber, wire and wire cable having these characteristics are therefore suitable. Brass-plated, monofilament steel wire having diameters from .005 to .045 inch are especially suitable. However, it is not necessary that these filaments be round in cross section and in some applications there cross section will be rectangular or oval to obtain better "bend" flexibility along the minor axis of their cross section without sacrificing burst strength. Since the tube-tire is an integral unit having a self-contained air volume, explosive deflations are highly unlikely and if they occur are far less hazardous than similar deflations in conventional tires.

In the preferred method of fabricating the novel tube-tire, a split toroidal cavity mold is utilized having the desired oval cavity cross section that has the same inside dimensions and configuration as the tube member 21 to form a rigid core mandrel. A spacer can be used between the two halves of the cavity mold to increase the K dimension (refer to FIG. 11) when a wider tube-tire is desired. Also, the cavity may include ridges or projections for providing the grooves 28 in the tube member in which the roll restraining hoops 27 are received.

In this cavity mold a rigid core structure 100 (FIG. 11) is fabricated as a mandrel for building the novel tube-tire. For example, the cavity is filled with the mixture of cork, sand, sodium silicate and iron oxide in a manner in which this mixture can be tightly compressed within the mold cavity. Thereafter, $CO_2$ gas under pressure is passed through the mixture in the mold cavity which ultimately fuses the mixture into a rigid toroidal sand core with the selected oval cross section. The sand core is carefully removed from the mold cavity and placed in an oven where it is baked for 24 hours at approximately 200° F. to improve its structural integrity. Of course, it should be appreciated that the core could be made of other materials, so long as it can be eventually disintegrated and removed through the valve stems of the completed tube-tire.

After forming the toroidal sand core, the tube member 21 is molded thereon after prefabricated valve stems 24 have been located about the inner periphery of the core. These steam include a flat base portion that is usually received in recesses formed in the sand core for locating them. Forming the tube member onto the core structure can be accomplished in several ways. Layers of uncured elastomer can be wrapped about the core carefully and roller (stitched) against the sand core so a uniform uncured elastomer layer surrounds the core structure of an appropriate thickness. If desired, this uniform layer can be wrapped with nylon shrink tape and the resulting assembly cured with steam at approximately 300° F. after which the shrink tape is removed. Alternatively, a tube member can be formed by wrapping the core with several bands of uncured elastomer and placing it in a transfer mold where the uncured elastomer bands properly position the core and subsequently transfer molding elastomer around the entire core and curing it under heat and pressure. When the tube member is formed by transfer molding, the outer surface of the resulting tube member is cleaned to remove mold release agents and buffed to insure good adhesion with bond adhesive and uncured elastomers employed in building the tube-tire carcass 40. The buffing is not necessary when the tube member is not cured at this stage.

The tube member is formed of an elastomer of low permeability with a good capability for adhesion to the adhesives and reinforcing filament which will be subsequently wrapped on its surface. Good fatigue life is required and a 30 durometer hardness butyl rubber with a tensile strength of 1,400 p.s.i. and elongation of 650% is a suitable elastomer which can be employed. Obviously, other natural or synthetic materials having these desired characteristics can be employed to form the tube member. Of course, selection of the elastomer will depend also on the method in which the tube member is formed. For example, the composition used in transfer molding might vary from that used in hand lay-up operations.

If the tube member is of a cured type, subsequent to buffing and adhesive coating or cement such as neoprene followed by a second coating of adhesive or cement, such as natural rubber and neoprene mixtures which are applied to the outer surface of the tube member. At this point, the roll restraining hoops 27, if not already molded in the wall of the tube member, are placed in grooves 28, one located on each side of the tube member, which have been provided for positioning of these roll restraining hoops at the base of each sidewall 26. The roll restraining hoops are prefabricated and are dimensioned to fit accurately in the grooves in the tube member.

These roll restraining hoops are generally built on a separate drum having an appropriate surface matching the contour of the grooves 28 and can be fabricated from extensible or inextensible filaments. For example, a steel cable which is wrapped in a circular manner on a drum along with layers of rubber to insulate the several strands and the resulting inextensible hoop assembly may be cured under heat and pressure. An extensible hoop can be formed in a similar manner with a nylon filament. The cross sectional configuration of the hoops will vary depending upon the groove configuration but normally will have a triangular cross section so that the outer edge of each hoop will fair into the base of its sidewall.

It is desirable to isolate the multiple strands from one another by the use of elastomer, and in the case of cables, improved results can be obtained where the cable itself is impregnated with rubber to separate its individual strands.

With the roll restraining hoops in place, a layer of uncured elastomer and a thin strip of fabric are usually placed around the tube member over the area of the hoops to insulate them from the reinforcing filament 30 which is to be subsequently wrapped on the oval toroidal tube member. The tube member, if cured and buffed, is coated with adhesive and placed in a winding machine wherein the tube member is wrapped with an inextensible reinforcing filament 30 in a helical manner. The reinforcing filament 30 normally consists of a monofilament steel wire of high tensile strength which is brass plated to insure good adhesion with the elastomers. The wrapping machine wraps the surface of the torus so that its inside diameter is from 60 to 100 percent covered with filament loops as earlier indicated. In the areas of the valve stems 24 which are removed from their base plates in which they are threaded the loops are wound over the opening in their normal path on the rim wall 35 and are subsequently displaced so that they will be bunched on opposite sides of the stem opening when the stem is inserted in the base plate. Thus, the loops need not be severed and connected to some type of anchor ring structure around the valve stem. The winding of the filament around the toroidal tube member is continued until the starting wrap point is reached where the winding is halted and the two ends of the filament are joined, preferably on the inner diameter of the toroidal tube member.

At this juncture, uncured elastomer shoulders 42, triangular in cross section, are positioned at the top of each sidewall to extend the substantial flat crown 34 on either side of the tube-tire carcass over each sidewall 26 to protect it. Thereafter, the entire exterior surface of the tube-tire carcass is covered with an elastomer adhesive or cement and normally a fabric layer 43 is applied on the flat surface of the extended crown. Generally, this layer of fabric and elastomer adhesive or cement is approximately $\frac{1}{16}$ of an inch. Also, the whole entire exterior surface of the tube-tire carcass can be covered with fabric to achieve greater resistance to puncture, if desired. A thin layer 44 of adhesive is then applied to the crown if covered with fabric.

Figure 9:
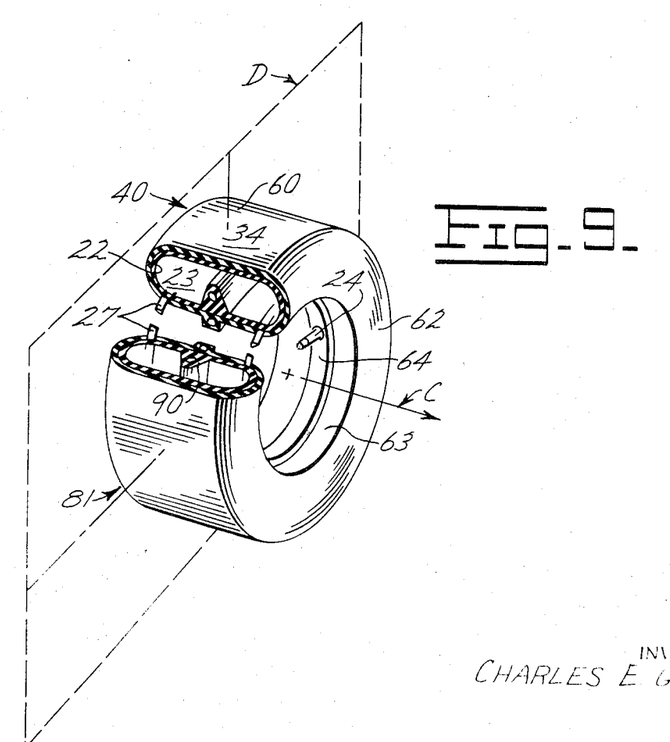
FIG. 9 is a perspective of a completed tube-tire carcass with parts broken away on which the tread belt shown in FIG. 8 can be assembled.

At this juncture, the method of manufacture may vary since the steps are somewhat different if the tube-tire is to be an integral unit as shown in FIG. 1 or a tube-tire with a removal tread belt 80 as illustrated in FIGS. 8 and 9. For fabrication of the integral tube-tire (FIG. 1), an inextensible filament 45 is helically wound circumferentially across the substantially flat extended crown of the build-up tube-tire carcass 40 to form the circumferential belt 41. Normally, this filament is a high-strength wire or cable or elastomer impregnated cable and covers from 60 to 95 percent of the extended crown and is helically wound, starting at one side of the extended crown and ending at the opposite side, with each free end of the filament secured to its next adjacent loop. These loops are substantially parallel with the mid-circumferential plane of the tube-tire.

Normally, two circumferential belts are not applied to the tire; but if this is desired for heavy duty or puncture resistance, a layer of elastomer and a layer of fabric are placed over the first circumferential belt 41 and thereafter a subsequent layer of elastomer adhesive or cement is applied to the fabric after which a second circumferential belt is wound with filament 45 in exactly the same manner, as the first circumferential belt.

Once the integral tube-tire carcass is completed as described above, the elastomer is applied to form the outer elastomer casing of the tube-tire.

Generally, a $\frac{1}{16}$ inch of elastomer is placed on the inner I.D. of the build-up carcass to form the casing rim wall 63 and a similar elastomer layer having high-quality adhesive characteristics is placed on the sidewalls of the tube-tire carcass to form the casing sidewalls 62. These layers are "stitched" to the tube-tire carcass with a serrated roller so that any trapped air is removed between the several layers and the tube-tire carcass. A layer of the same elastomer may be applied over the circumferential belt 41 to form the under-tread 60 of the integral tube-tire. Subsequently, an elastomer tread stock is placed about the circumference of the tire to form the actual tread 61.

Generally, the same elastomer stock is used in forming the casing rim wall, casing sidewall and undertread of the tire. This elastomer should have high resistance to the effects of ozone plus good adhesive characteristics with the elastomers and reinforcement used to build the tube-tire carcass. Also, good flexing characteristics under tension are desired and the elastomer should have high resistance to penetration of sharp objects. A typical elastomer would be a 50 durometer hardness rubber with a tensile strength of 2,800 p.s.i. and an elongation of approximately 500%.

In the actual tread 61, the desired characteristics are somewhat different. Normally, the actual tread must resist wear as the tube-tire rolls through its footprint on the surface over which the vehicle is traveling and should be highly resistant to cutting and other abuse that will occur during such traverse. Generally, the tread elastomer should be a 60 durometer rubber with a low hysteresis and a high-tear resistance. Tensile strength should be in the range of 3,000 p.s.i., and an elongation of approximately 500% is desirable.

Obviously, care should be taken that compatible rubber stocks and curing agents are employed in the elastomers. However, this caution is conventionally observed and can be appreciated by those skilled in the art. Further, while a single elastomer stock can be used to form the entire outer casing, an improved performance is achieved by selecting the several elastomers with the desired characteristics for different portions of the tube-tire.

Above, the description of the manufacture of the integral tube-tire is covered. If the tire is to be a belted tire in which the circumferential belt is included in a removable tread belt 80, the tube-tire carcass 40 is not wound with the circumferential belt. Instead, the elastomers forming the casing rim wall, casing sidewall, and undertread are placed on the carcass after fabric layer 43 has been placed about the circumference of the extended crown of the tube-tire carcass as previously described and the carcass is cured in the same manner as is the integral tube-tire described below.

After these elastomer stocks have been applied to the tube-tire carcass of the integral tube-tire, it is ready for vulcanizing or cure. It is placed in a heated mold which is closed and the air chamber of the tube-tire carcass is pressurized to approximately 60 p.s.i. usually with steam, while the curing temperature is raised to 280° F. Subsequently, the pressure in the air chamber is raised to between 80 and 400 p.s.i. which is maintained until vulcanization has been completed. Usually, the vulcanization step requires approximately an hour or more.

After vulcanization, the tube-tire is removed from the mold and allowed to cool to about 200° F. after which a 25% solution of sodium hydroxide is injected into the air chamber of the tube-tire which still contains the sand core and allowed to permeate throughout the core. The application of vacuum through one of the valve stems while the solution is introduced through another on the core will help the solution permeate throughout the core. The sodium hydroxide solution should be allowed to remain in the core for approximately an hour, after which agitation or vibration is employed to achieve disintegration at the core. Thereafter, a flushing water solution is introduced through one valve stem 24 to wash out the disintegrated core from the air chamber through the other valve stems. The water flushing step can be followed by adhesive materials in a solvent vehicle to fill any irregular pores on the inside surface of the tube member.

The tube-tire is placed in an appropriate fixture and pressurized to 150 p.s.i. to check for leaks. Passing this test, the tube-tire is completed if the integral type and, if it is the removable belted type, the tread belt is added while the unit is deflated either before or after the tube-tire is placed on the appropriate rim structure.

If the tube-tire is manufactured with a replaceable or removable tread belt 80, the tread belt is formed on a drum assembly which has an outer diameter substantially equal to the outer diameter of the tube-tire carcass which includes the under tread and reinforcing loops. This drum diameter can be smaller by an inch or so than the carcass to create greater interference or an inch or so larger. A strip or belt of elastomer is placed on the circular drum in a circumferential manner which may be followed by a fabric layer on which a coat of elastomer adhesive or cement is applied. Subsequently, filament 45 is wound on this resulting band to form this circumferential belt 41 in the same manner as it would be wound on the extended crown 34 of the integral tube-tire previously described. A second circumferential belt can be wrapped with the same technique after elastomer and fabric have been placed on top of the first belt insulating it from the second, if desired. Also, various other fibers and filaments may be incorporated in the belt to reduce its tendency to spread and to obtain improved dirt seals. After the band tread belt has been reinforced an elastomer tread stock is applied over the outside of the circumferential belt after it has been coated with a suitable elastomer adhesive or cement. Thereafter, the uncured tread belt 80 is placed in a suitable mold and cured under heat and pressure while still on the fabricating drum structure. Thereafter, the tread belt can be removed and can be assembled on the previously cured tube-tire carcass which does not have a circumferential belt 41.

While the above fabrication of the tire has been described with a sand core which forms a mandrel on which the tube-tire is fabricated, it should be appreciated that other suitable core structures might be employed such as a cold hardening, soluble material. A core material sold under the trade name "Rezolin" manufactured by Rezolin Manufacturing Corporation is such a material.

In some of the drawings, the relative sizes of the reinforcing filaments (30 and 45) are accentuated to more clearly illustrate the invention.

Further, the loops of inextensible filaments 30 and 45 have been indicated as being substantially normal and parallel to the mid-circumferential plane of the tube-tire. It is recognized that the loops which are formed by winding the filament in a helical manner are not essentially in a plane but for the purposes of describing their relative relationship in the carcass it is assumed that they have a mean or average plane which is perpendicular or normal to the mid-circumferential plane of the tube-tire even though the loops will have their beginning and end points displaced by the pitch of the helix in such a winding operation. Also, it is indicated in the specification that the loops of filament 30 lie in a "quasi-radial" plane because of the pitch of helical winding. However, it is possible that the loops could be a plurality of continuous closed loops which actually could be positioned in a radial plane. Thus, it is not intended by this discussion to be a limitation but rather clarification in the terminology.

Tests with preliminary prototypes of the new tube-tire have indicated that their service-life per increment of tread wear is five times longer than that obtained with conventional tires for the same increment of tread wear. Through the design of the carcass and elimination of conventional beads the prototype tube-tires with replaceable tread belts, can provide extended service-lives due to its cool running characteristics, barring puncture, along with the variable operating pressure feature.

What is claimed is:

1. A process for the manufacture of a belted oval tube tire with an integral tube comprising the steps of:
    forming a disintegratable toroidal core member having a preselected accentuated oval cross section whose major axis is parallel with an axis of revolution of said core member, said oval cross section being congruent with the oval cross section of the tube tire when the latter is in service, said core member having a substantially flat crown on its outer peripheral surface connecting its semi-circular side walls, said flat crown extending across a substantial portion of the width of said core member exclusive of its semi-circular side walls;
    forming a pressurizable tube member on the outer surface of said core member by applying uncured rubber to the surface of said core member, said tube member having at least one valve aperture through which said core member can be removed and through which it can be pressurized;
    reinforcing said tube member on said core member with a plurality of loops of substantially inextensible reinforcing encircling said tube member while maintaining said tube member in its preselected oval cross section, said loops being oriented substantially normal to the mid-circumferential plane of said tube member;
    encasing said tube member reinforced with said loops with additional elastomers forming its outer casing with said core member intact and subsequently curing said elastomer and said additional elastomers to form a pressurizable carcass for said tube tire; and disintegrating and removing said core member through said at least one valve aperture.

2. The process according to claim 1 wherein the tube member is formed by transfer molding elastomers around the core.

3. The process according to claim 1 wherein the tube member is reinforced with the plurality of loops by winding with at least one inextensible filament under constant tension in a helical manner about said tube member to form a plurality of connected loops encircling the said tube member.

4. The process according to claim 3 wherein the inextensible filament is monofilament brass plated steel wire having a diameter from .005 to .045 inch.

5. The process according to claim 1 wherein the inextensible circumferential belt is fabricated separately on a cylindrical surface having an outer diameter substantially equal to the outer diameter of the tube member reinforced with the loops and supported by said core member, and vulcanizing said circumferential belt with elastomers forming the tread of the tube-tire to form a replaceable tread belt.

6. The process according to claim 1 wherein the tube member is internally pressurized during vulcanization.

7. The process as defined in claim 1 which includes the step of locating inextensible roll restraining hoops adjacent to opposite sides of the inner periphery of the core member before said tube member is formed thereon and subsequently reinforced with a plurality of loops.

8. The process defined in claim 7 wherein grooves are formed in the inner periphery of the core member that includes the step of locating the roll restraining hoops in said grooves so the tube member will have a smooth outer surface when it is formed thereon with said roll restraining hoop encased by said tube member.

9. A process for the manufacture of a belted oval tube tire with an integral tube member comprising the steps of:

forming a disintegrable toroidal core member with a substantially flat outer circular periphery and having an oval cross section which has a major axis parallel with the axis of revolution of said core member and said flat outer circular periphery, said core member being sized to be congruent in cross section with the hollow cross section of a tube member in the resulting tube tire when the latter is in service, said flat outer circular periphery having a substantially flat width approximating the width of said core member;

fabricating a pressurizable tube member of uncured elastomer on the surface of said core member by applying a layer of uncured rubber thereon and forming valve means in its inner circular periphery for pressurizing it;

reinforcing said tube member with a plurality of encircling inextensible reinforcing loops by winding an inextensible filament on the outer surface of said tube member while it is supported on said core member to said loops are oriented substantially normal to a mid-circumferential plane of said tube member;

subsequently covering the resulting reinforced tube member with uncured elastomer;

then vulcanizing it while it remains supported by said core member; and thereafter removing said core member by disintegrating it and removing it through said valve means.

10. The process defined in claim 9 wherein the filament is wound under tension during the step of reinforcing the tube member with a plurality of encircling inextensible reinforcing loops.

11. The process defined in claim 9 which includes the step of internally pressurizing the tube member through the valve means when it is being vulcanized and has its outer surfaces contained by a fitted female mold.

12. The process defined in claim 9 which includes the step of locating an inextensible hoop at each side of the inner circular periphery of the core member prior to the steps of forming the tube member thereon and subsequently reinforcing said tube with a plurality of encircling inextensible loops.

13. The process defined in claim 9 that includes the step of applying an inextensible circumferential belt on the substantially flat outer circular periphery of the reinforced tube member prior to the vulcanization step, said belt being formed with at least one cylindrical ply of inextensible reinforcing helically wound substantially parallel to the mid-circumferential plane of said tube member with said cylindrical ply having a width at least equal to the width of the substantially flat outer periphery of said reinforced tube member.

14. The process defined in claim 13 wherein the step of applying an inextensible belt comprises helically winding inextensible reinforcing in a side-by-side manner from one side of the flat outer circular periphery to the other side.

15. The process defined in claim 14 wherein the cylindrical ply covers from 65 to 95 percent of the substantially flat outer circular periphery of the reinforced tube member.

16. The process defined in claim 9 wherein the pressurizable tube member is fabricated with a uniform wall thickness.

17. The process defined in claim 9 having an added step subsequent to vulcanization of assembling an inextensible circumferential belt on the flat outer circular periphery of the reinforced tube member, said belt having an inner cylindrical diameter substantially equal to the outer diameter of said reinforced tube member when it is supported by said core.

18. The process defined in claim 17 wherein the inextensible circumferential belt includes at least one cylindrical ply of inextensible reinforcing wound in a side-by-side relationship across the width thereof.

19. The process defined in claim 18 wherein the inextensible circumferential belt includes elastomer encasing said cylindrical ply and vulcanized therewith prior to assembling it with the reinforced tube member.

20. The process as defined in claim 1 which includes the steps of fabricating an inextensible circumferential belt having an inner diameter substantially conforming to the outer diameter of the substantially flat crown of said tube member reinforced with the plurality of loops while it is supported by said core member, said belt having a width at least equal to the width of said flat crown and assembling said belt on said substantially flat crown of said tube member reinforced with said loops where it is operable to prevent expansion of said flat crown when the tube member is subsequently pressurized.

21. The process defined in claim 20 which includes the step of placing a layer of elastomer between the belt and the loops reinforcing the tube member.

22. The process according to claim 20 wherein the inextensible circumferential belt is fabricated and located by winding an inextensible filament in a helical manner on the tube member reinforced with the loops, said winding extending from one side of the substantially flat crown of the core member to the other side with the pitch of the helically winding being within 1/8 of a degree of being parallel with the mid-circumferential plane of the tire.

23. The process according to claim 22 wherein the tube member reinforced with the loops, the circumferential belt wound thereon, and the elastomers forming the outer casing and tread are simultaneously vulcanized under heat and pressure into an unitary tube-tire.

24. The process according to claim 23 wherein the core is disintegrated subsequently to the vulcanizing step and washed out of the inside of the tube member through valve stems for pressurizing said tube member.

References Cited

UNITED STATES PATENTS

| | | | |
|---|---|---|---|
| 2,915,102 | 12/1959 | Alexoff et al. | 156—123 X |
| 3,409,492 | 11/1968 | Yoe | 156—133 X |
| 3,458,146 | 7/1969 | Warner | 156—117 X |
| 3,427,213 | 2/1969 | Alderfer | 156—129 |
| 2,792,868 | 5/1957 | Benson | 156—124 X |
| 2,814,330 | 11/1957 | Vanzo et al. | 156—414 X |
| 1,407,839 | 2/1922 | Clinefelter et al. | 156—133 |
| 3,245,853 | 4/1966 | Reinhart | 156—117 |
| 3,620,867 | 11/1971 | Bartley | 156—117 |
| 3,392,072 | 7/1968 | Alderfer | 156—123 |

FOREIGN PATENTS

| | | | |
|---|---|---|---|
| 26,874 | 1912 | Great Britain | 156—414 |

ALFRED L. LEAVITT, Primary Examiner

C. B. COSBY, Assistant Examiner

U.S. Cl. X.R.

156—110, 121, 123, 129, 133, 394, 414

UNITED STATES PATENT OFFICE
CERTIFICATE OF CORRECTION

Patent No.    3,776,792        Dated    December 4, 1973

Inventor(s)    CHARLES E. GRAWEY

It is certified that error appears in the above-identified patent and that said Letters Patent are hereby corrected as shown below:

Column 5, line 69, "mid-ciricumferential" should read -- mid-circumferential -- . Column 10, line 37, "betewen" should read -- between -- . Claim 9, line 60, "to" should read -- so -- . Claim 22, line 7, "helically" should read -- helical -- .

Signed and sealed this 6th day of August 1974.

(SEAL)
Attest:

McCOY M. GIBSON, JR.
Attesting Officer

C. MARSHALL DANN
Commissioner of Patents